(12) United States Patent
Lin et al.

(10) Patent No.: US 8,075,170 B2
(45) Date of Patent: Dec. 13, 2011

(54) AUTOMOBILE WHEEL RIM LIGHT DECORATION DEVICE WITH ADJUSTABLE SENSING INTERVAL

(75) Inventors: Rocky Yi-Ping Lin, Taipei (TW); Kun-Hsiang Wang, Taipei (TW)

(73) Assignee: Rocky Yi-Ping Lin, Taipei (TW)

( * ) Notice: Subject to any disclaimer, the term of this patent is extended or adjusted under 35 U.S.C. 154(b) by 201 days.

(21) Appl. No.: 12/689,405

(22) Filed: Jan. 19, 2010

(65) Prior Publication Data

US 2011/0176322 A1     Jul. 21, 2011

(51) Int. Cl.
*B60Q 1/26* (2006.01)
(52) U.S. Cl. ........................................ 362/500; 362/464
(58) Field of Classification Search .................. 362/464, 362/487, 500, 540
See application file for complete search history.

(56) References Cited

U.S. PATENT DOCUMENTS

| | | | | |
|---|---|---|---|---|
| 2002/0163817 A1* | 11/2002 | Bukowsky | ..................... | 362/500 |
| 2003/0151924 A1* | 8/2003 | Gloodt et al. | .................. | 362/500 |
| 2005/0030756 A1* | 2/2005 | Thomas et al. | ................ | 362/500 |
| 2007/0171664 A1* | 7/2007 | Shih et al. | ...................... | 362/500 |
| 2007/0274085 A1* | 11/2007 | Hampton | ....................... | 362/500 |

FOREIGN PATENT DOCUMENTS

TW          M253507          12/2004

* cited by examiner

*Primary Examiner* — David V Bruce
(74) *Attorney, Agent, or Firm* — Chun-Ming Shih; HDLS IPR Services

(57) ABSTRACT

An automobile wheel rim light decoration device includes a light emitting module, an adjustable rod and a pair of sensing elements. The light emitting module includes a retaining base disposed at the wheel rim and a light emitting unit fixed to the retaining base. The adjustable rod includes a fixed rod installed at the retaining base and a movable rod coupled to the fixed rod. The sensing element includes a first sensing elements fixed to an automobile brake component and a second sensing element corresponding to the first sensing element and fixed to the movable rod for detecting signals of the first sensing element. The fixed rod is moved horizontally in a through slot of the retaining base, and the movable rod is moved vertically with respect to the fixed rod, such that relative positions of the first and second sensing elements can be changed to achieve the desired sensitivity.

14 Claims, 7 Drawing Sheets

AUTOMOBILE WHEEL RIM LIGHT DECORATION DEVICE WITH ADJUSTABLE SENSING INTERVAL

FIELD OF THE INVENTION

The present invention generally relates to light decoration, in particular to a light emitting decoration installed onto an automobile wheel rim.

BACKGROUND OF THE INVENTION

In addition to the performance, drivers also would like to drive an automobile with a unique and modern design, and thus a light emitting decoration device is generally installed at a wheel rim to improve the visual feeling and provide a warning effect for driving automobiles at nighttime. As disclosed in Taiwan Patent No. M253507, a vibrating light emitting device is installed at an appropriate position of a wheel rim cover, wherein an integrally formed box-containing groove is extended to the wheel rim cover inwardly for installing and fixing the light emitting device, such that light emitting members of the vibrating light emitting device can be arranged towards an external side, and the light emitting members can emit light after the detection and vibrations take place, and also can change the colors of the emitted light.

In the foregoing structure, the light emitting members emit light after vibrations take place and change the color of the emitted light according to frequencies of the vibrations. However, an automobile does not produce much or any vibration while it is being driven on a flat road surface, and thus the light emitting members cannot emit light or change the colors of the light appropriately according to the frequencies of the vibrations. In addition, a velocity sensor is installed onto the wheel rim, such that the light emitting members can change the color or brightness of the light according to the velocity of the automobile detected by the sensor. However, the velocity sensor is installed at the wheel rim, and thus the sensitivity of the velocity detection is reduced after mud and sand are adhered onto the sensor when the automobile is driven, and thus resulting in a poor sensing effect. Furthermore, automobiles come with different wheel rims, and thus the velocity sensors usually have problems of handling variable sensing intervals.

In view of the aforementioned shortcomings of the prior art, the inventor of the present invention based on years of experience in the related industry to conduct extensive researches and experiments, and finally developed an automobile wheel rim light decoration device with an adjustable sensing interval in accordance with the present invention to overcome the shortcomings of the prior art.

SUMMARY OF THE INVENTION

Therefore, it is a primary objective of the present invention to provide an automobile wheel rim light decoration device with an adjustable sensing interval, wherein an adjustable rod of the automobile wheel rim light decoration device can change its position with respect to a brake component, and a fixed rod can be moved horizontally in a through slot of a retaining base, and a movable rod can be moved vertically with respect to the fixed rod, such that relative positions of a first sensing element and a second sensing element can be changed to improve the sensitivity of the sensors of the wheel rim light decoration device.

To achieve the foregoing objective, the present invention discloses an automobile wheel rim light decoration device with an adjustable sensing interval, and the automobile wheel rim light decoration device comprises a light emitting module, an adjustable rod and a pair of sensing elements, wherein the light emitting module includes a retaining base installed at a wheel rim and a plurality of light emitting units fixed to the retaining base, and the adjustable rod includes a fixed rod installed at the retaining base and a movable rod coupled to the fixed rod, and the sensing elements are a first sensing element, and a second sensing element provided for detecting a signal of the first sensing element, and the first sensing element is fixed to a brake component, and the second sensing element is fixed to a movable rod and at a position corresponding to the first sensing element and electrically coupled to the light emitting unit. If the movable rod is adjusted when the movable rod is moved with respect to the fixed rod, relative positions of the first sensing element and the second sensing element can be changed.

Another objective of the present invention is to provide an automobile wheel rim light decoration device with an adjustable sensing interval, wherein a pair of sensing elements are installed to a brake component and fixed to a light emitting module of a wheel rim, and the sensing elements are provided for detecting a position of the wheel rim with respect to a car body and a rotating speed, and the detected signal is transmitted to a microprocessor installed on a circuit board of a light emitting unit for controlling the light emission time and color. By the principle of visual retention, pre-stored graphic files can be used for displaying stable figures with a changing light emission on a certain region of an automobile wheel one by one according to a predetermined sequence, while the wheel is rotating clockwise.

A further objective of the present invention is to provide an automobile wheel rim light decoration device with an adjustable sensing interval, wherein the sensor is an electromagnetic conversion sensor, such as a Hall sensor, provided for preventing mud and sand from covering the sensor, which will reduce the sensitivity of the detection. Since the relative positions of the first sensing element and the second sensing element are adjustable, therefore the present invention can be applied to various models of motor vehicles.

Compared with the prior art, the automobile wheel rim light decoration device with an adjustable sensing interval of the invention includes an adjustable rod capable of changing its relative position with respect to a brake component, and the adjustable rod includes a fixed rod installed into the retaining base and a movable rod coupled to the fixed rod, such that the fixed rod can slide horizontally in a through slot of the retaining base, and the movable rod can move vertically with respect to the fixed rod, and then the second sensing element is installed onto the movable rod for changing the relative positions (including vertical and horizontal adjustments) of the first sensing element and the second sensing element to achieve the required sensitivity. Since the relative positions of the sensing elements can be adjusted, therefore the invention is applicable for various models of cars, and the light decoration sensor can be installed for a flexible application to enhance the practicability and convenience of the present invention.

To make it easier for the examiner to understand the objects, characteristics and effects of this invention, we use preferred embodiments together with the attached drawings for the detailed description of the invention.

DESCRIPTION OF THE PREFERRED EMBODIMENTS

The technical characteristics and contents of the present invention will become apparent with the following detailed description accompanied with related drawings, but the drawings are provided for reference and illustration of the invention only, but not intended for limiting the scope of the invention.

Figure 1:
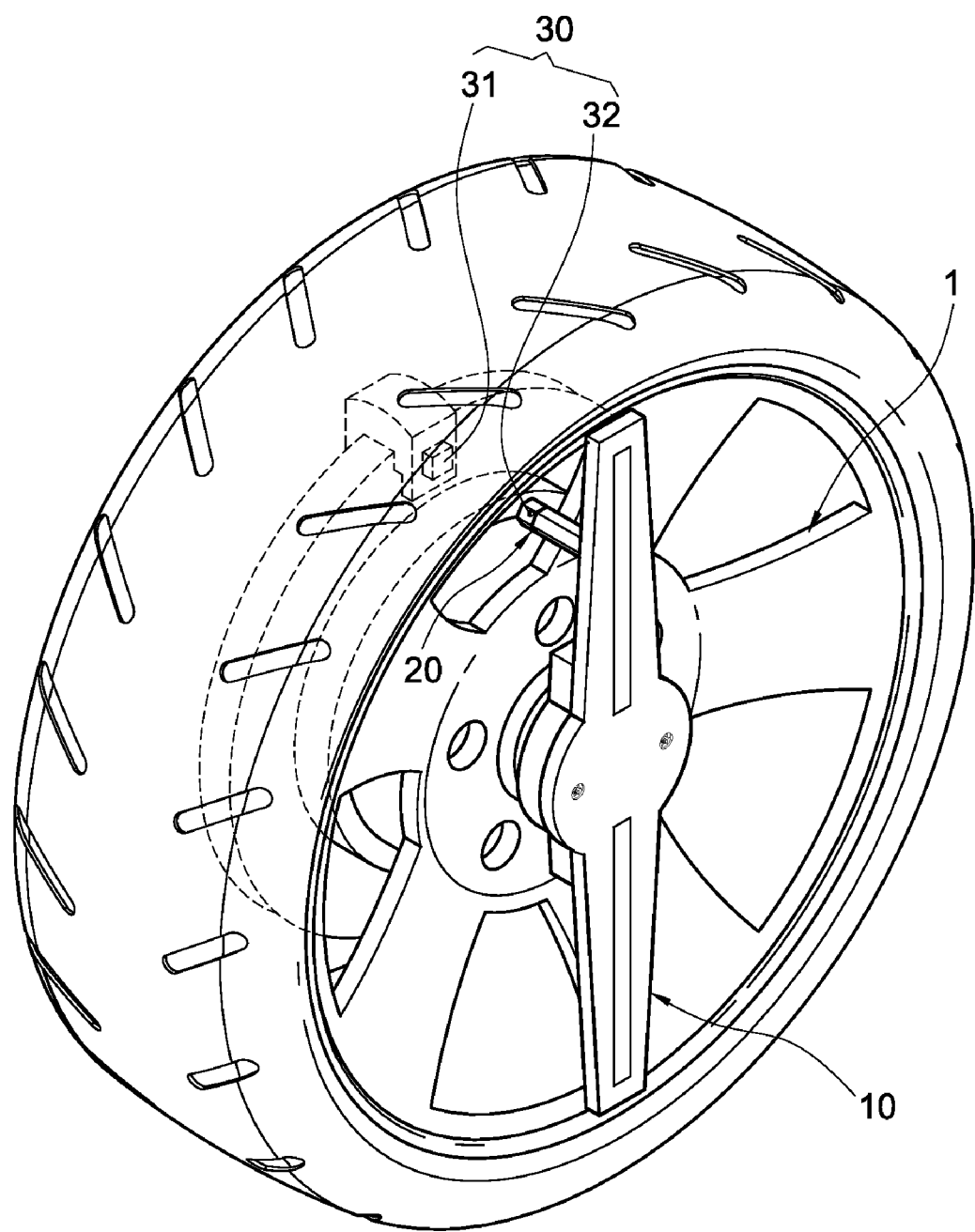
FIG. 1 is a schematic view of an automobile wheel rim light decoration device with an adjustable sensing interval in accordance with present invention.

With reference to FIG. 1 for a schematic view of using an automobile wheel rim light decoration device with an adjustable sensing interval in accordance with the present invention, the automobile wheel rim light decoration device comprises a light emitting module 10, an adjustable rod 20 and a pair of sensing elements 30, wherein the light emitting module 10 is installed to a wheel rim 1, and the adjustable rod 20 is installed onto the light emitting module 10, and the pair of sensing elements comprises a first sensing element 31 and a second sensing element 32 for detecting a signal of the first sensing element 31, and the first sensing element 31 and the second sensing element 32 are fixed onto the wheel rim 1 and the adjustable rod 20 respectively.

Figure 2:
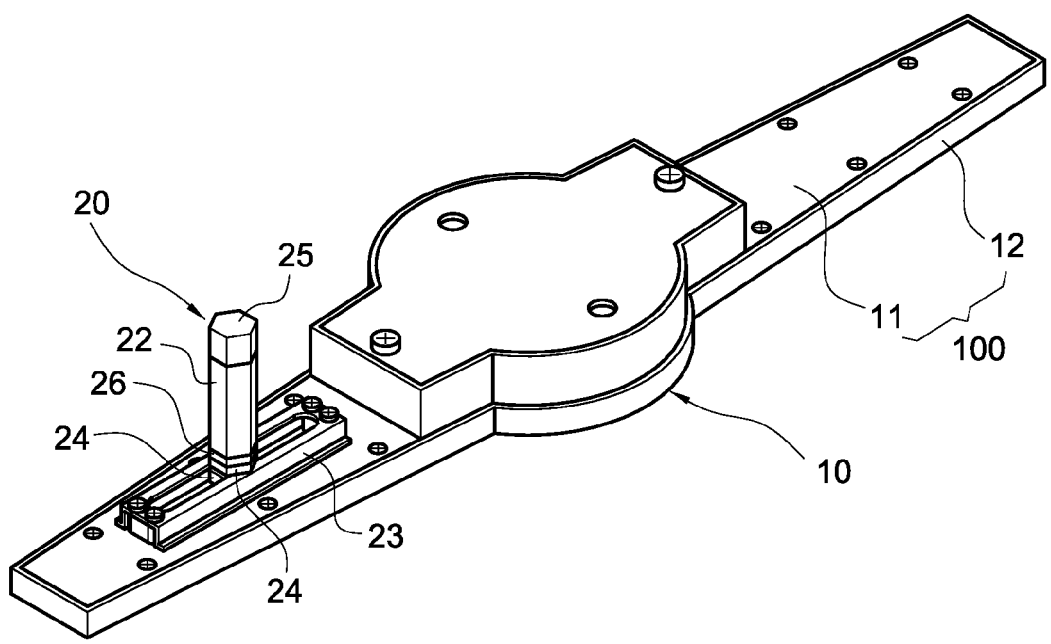
FIG. 2 is a perspective view of a light emitting module and an adjustable rod in accordance with present invention.
Figure 3:
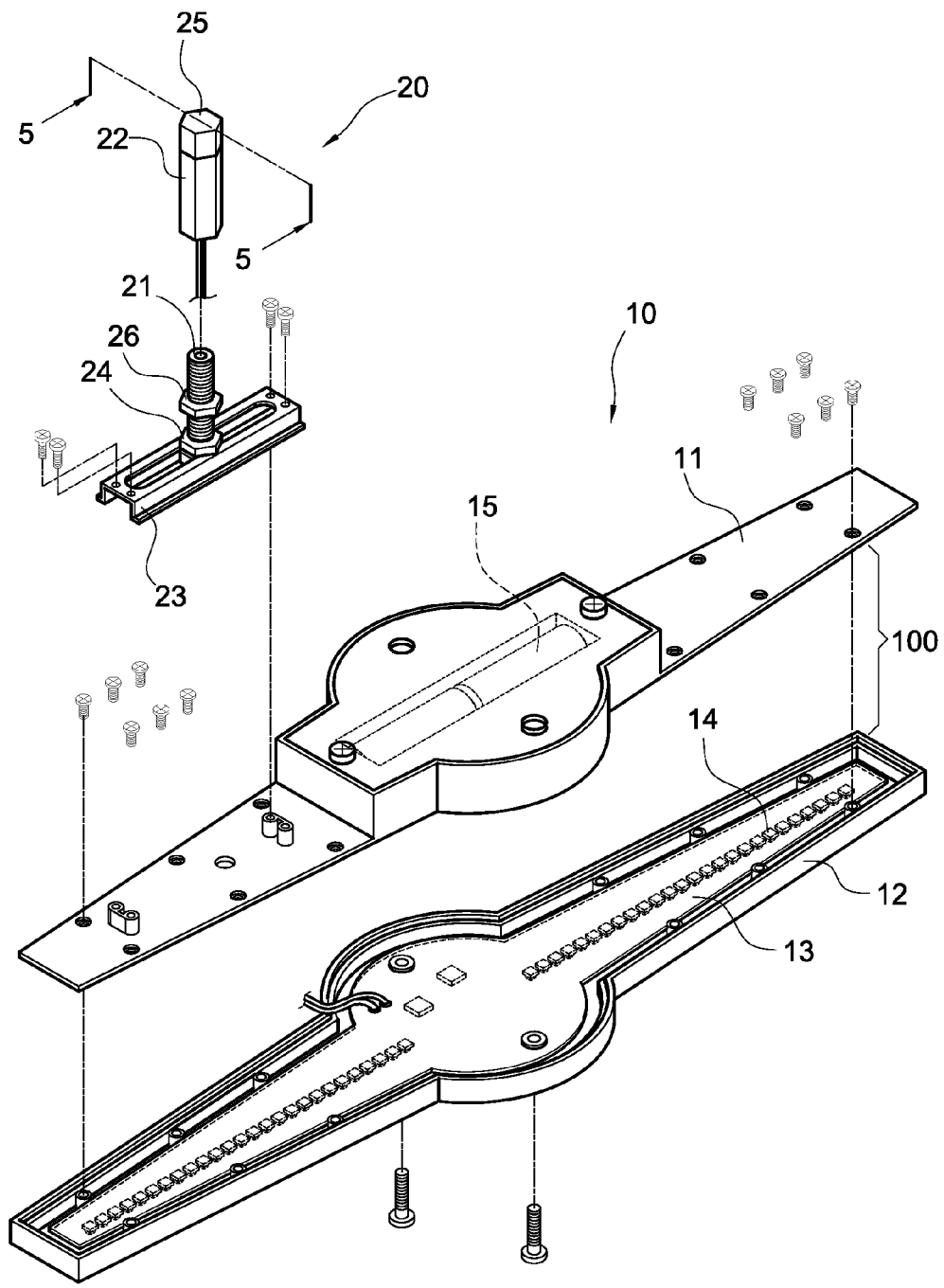
FIG. 3 is an exploded view of a light emitting module and an adjustable rod in accordance with present invention.
Figure 4:
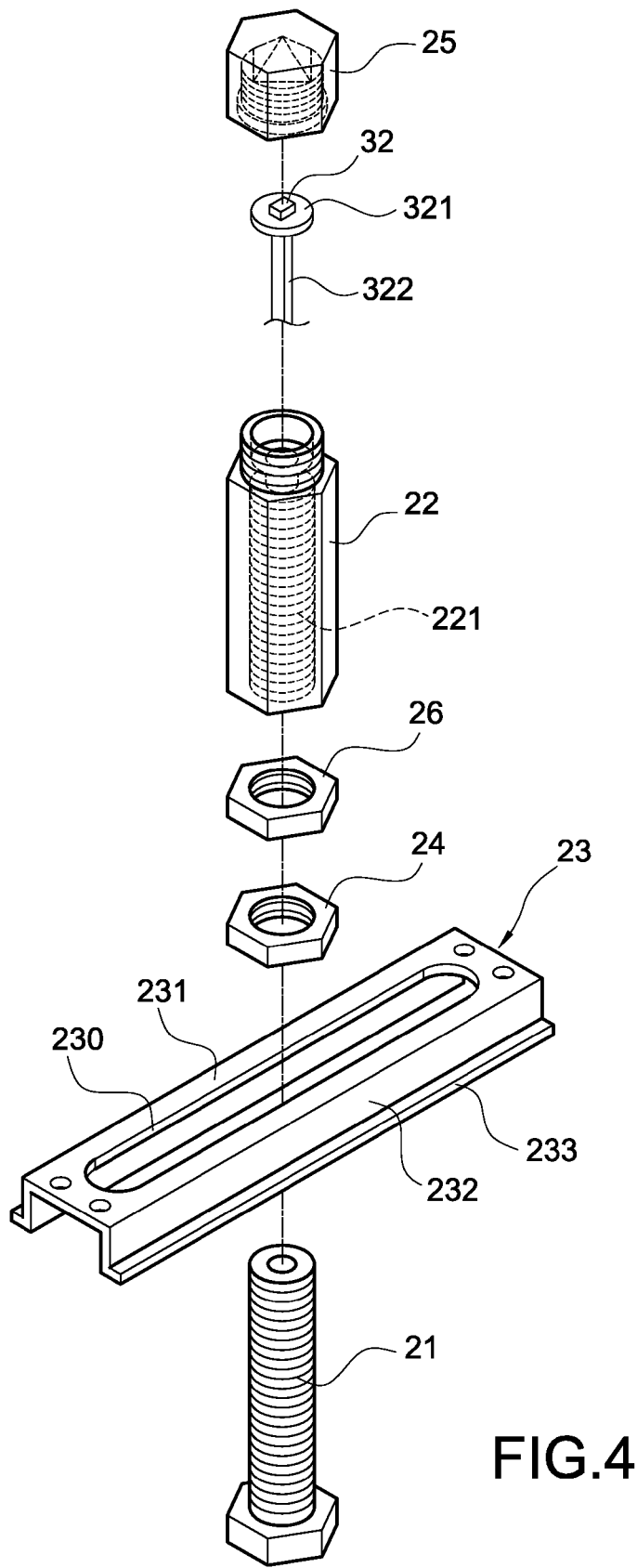
FIG. 4 is an exploded view of an adjustable rod in accordance with present invention.

With reference to FIGS. 2 to 4 for a perspective view and an exploded view of a light emitting module and an adjustable rod in accordance with the present invention, the light emitting module 10 includes a retaining base 100 mounted onto the wheel rim 1, and the retaining base 100 includes a bottom plate 11, a top cover 12 covered onto and engaged with the bottom plate 11, a circuit board 13 installed in the retaining base 10, wherein a plurality of light emitting units 14 are electrically coupled to the circuit board 13, and the light emitting unit 14 of this preferred embodiment is a light emitting diode. In addition, at least one battery 15 is installed at the bottom plate 11 for supplying electric power to the light emitting units 14.

The adjustable rod 20 includes a fixed rod 21, a movable rod 22 and a fixing frame 23, wherein the fixed rod 21 is passed into the fixing frame 23 and installed onto the bottom plate 11 by the fixing frame 23, and the movable rod 22 is coupled to the fixed rod 21 and capable of adjusting its movement with respect to the fixed rod 21, and the fixing frame 23 is coupled to the bottom plate 11 by a plurality of locking elements. In this preferred embodiment, the fixing frame 23 includes a flat plate 231 and two side plates 232 extended vertically from both lateral sides of the flat plate 231 respectively, wherein a support plate 233 is extended parallel to the two side plates 232 separately, and attached onto the bottom plate 11 flatly, wherein the flat plate 231 has a through slot 230, and the fixed rod 21 can be moved in the through slot to adjust a fixing position in a horizontal direction, and the fixed rod 21 can be a bolt passed through the through slot 230 and coupled to the fixing frame 23 by a nut 24, and the movable rod 22 has an internal thread 221, such that the movable rod 22 can be connected to the fixed rod 21 by a screw-and-nut connection and moved with respect to the fixed rod 21, and the movable rod 22 is fixed to a position of the fixed rod 21 by another nut 26.

Further, the second sensing element 32 is fixed to an end of the movable rod 22, and the second sensing element 32 includes a sensor circuit board 321 and a conducting wire 322 connected to the sensor circuit board 321, and the second sensing element 32 is electrically coupled to the circuit board 13 and the light emitting units 14 in the retaining base 100 by the conducting wire 322. In addition, a seal cover 25 is connected to an external end of the movable rod 22 and covered onto and engaged with the second sensing element 32 for preventing the second sensing element 32 from being moistened or damaged.

Figure 5:
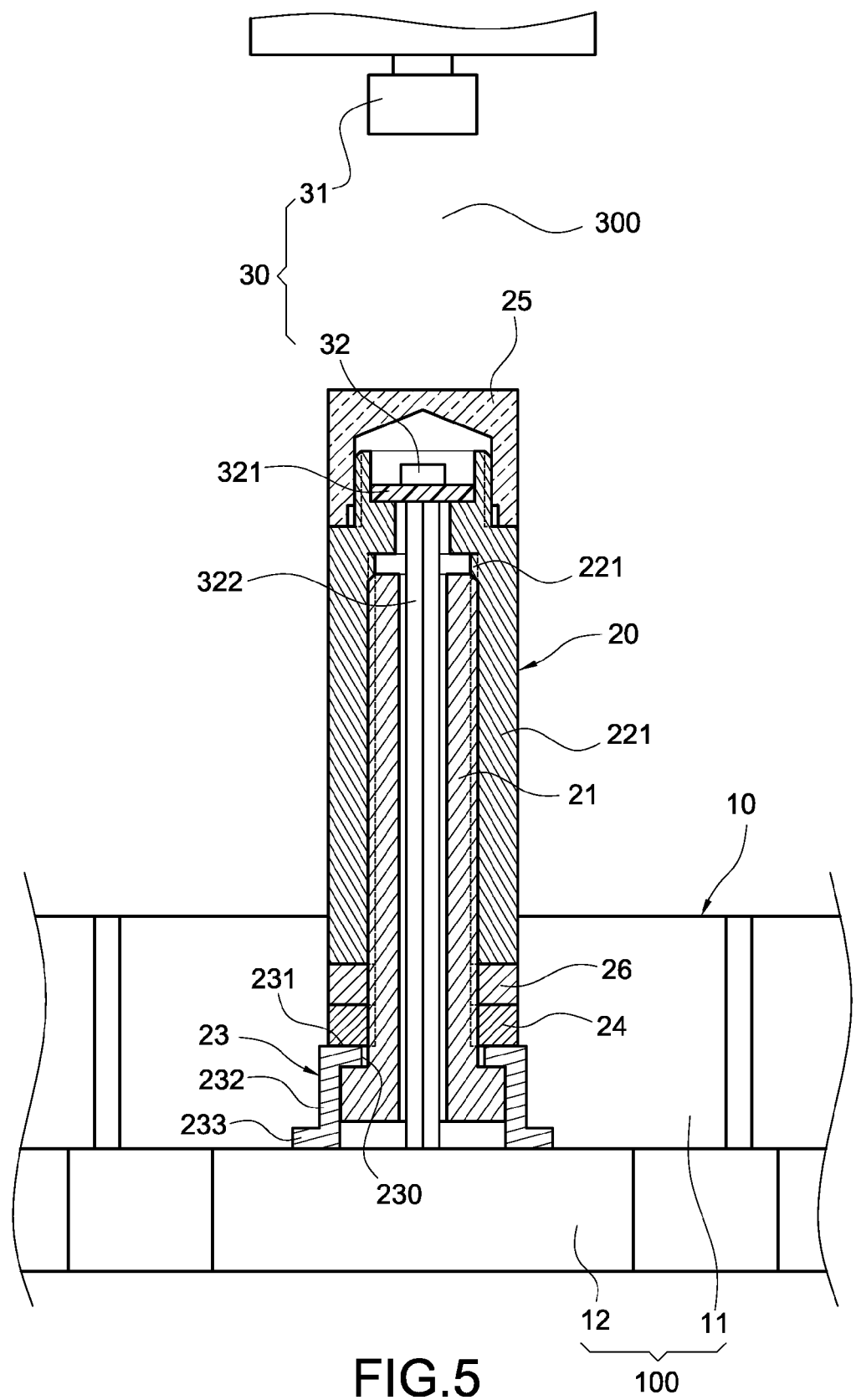
FIG. 5 is a cross-sectional view of an adjustable rod in accordance with present invention.
Figure 6:
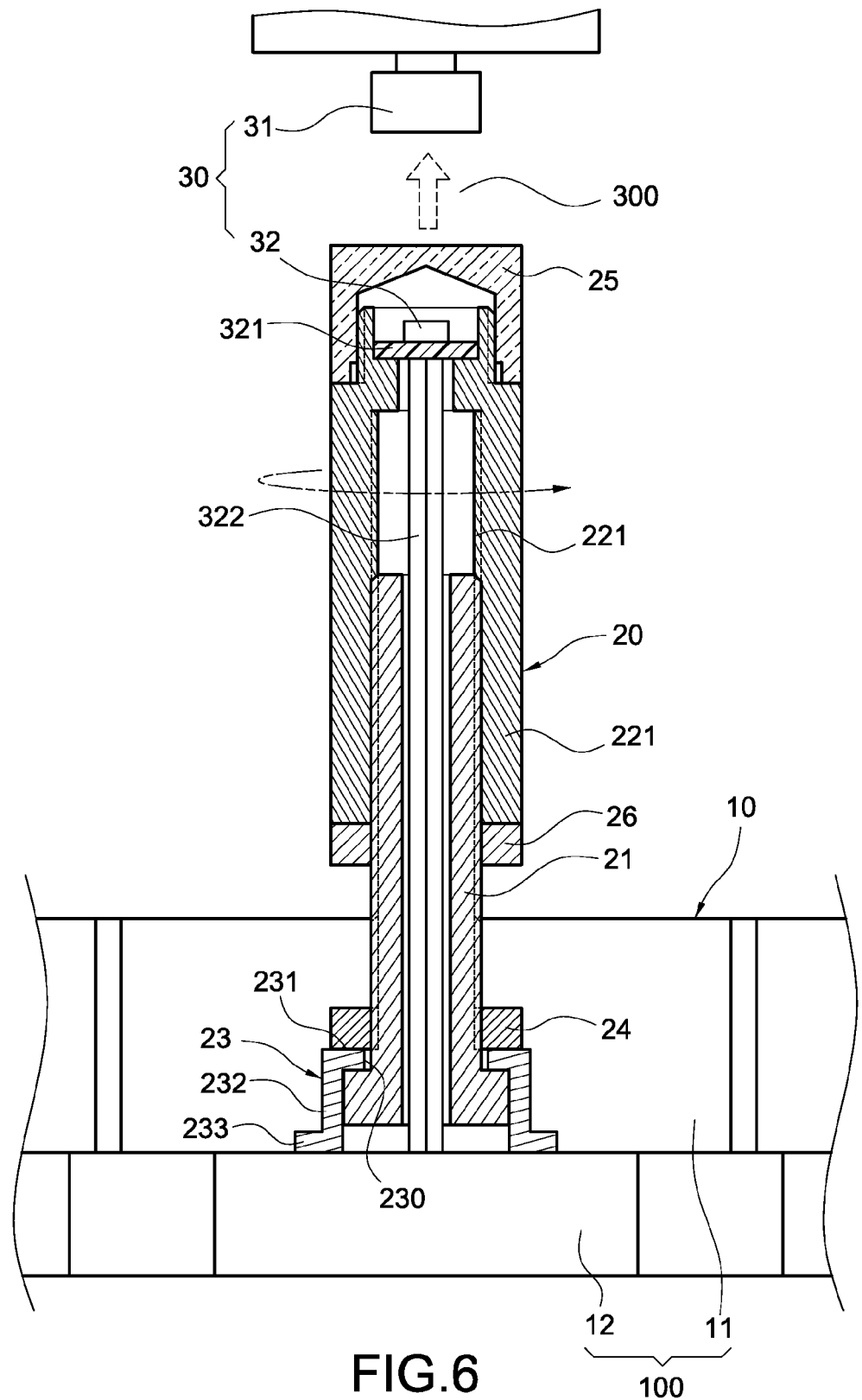
FIG. 6 is a schematic view of an adjustable rod for adjusting an interval of a sensor in accordance with present invention.
Figure 7:
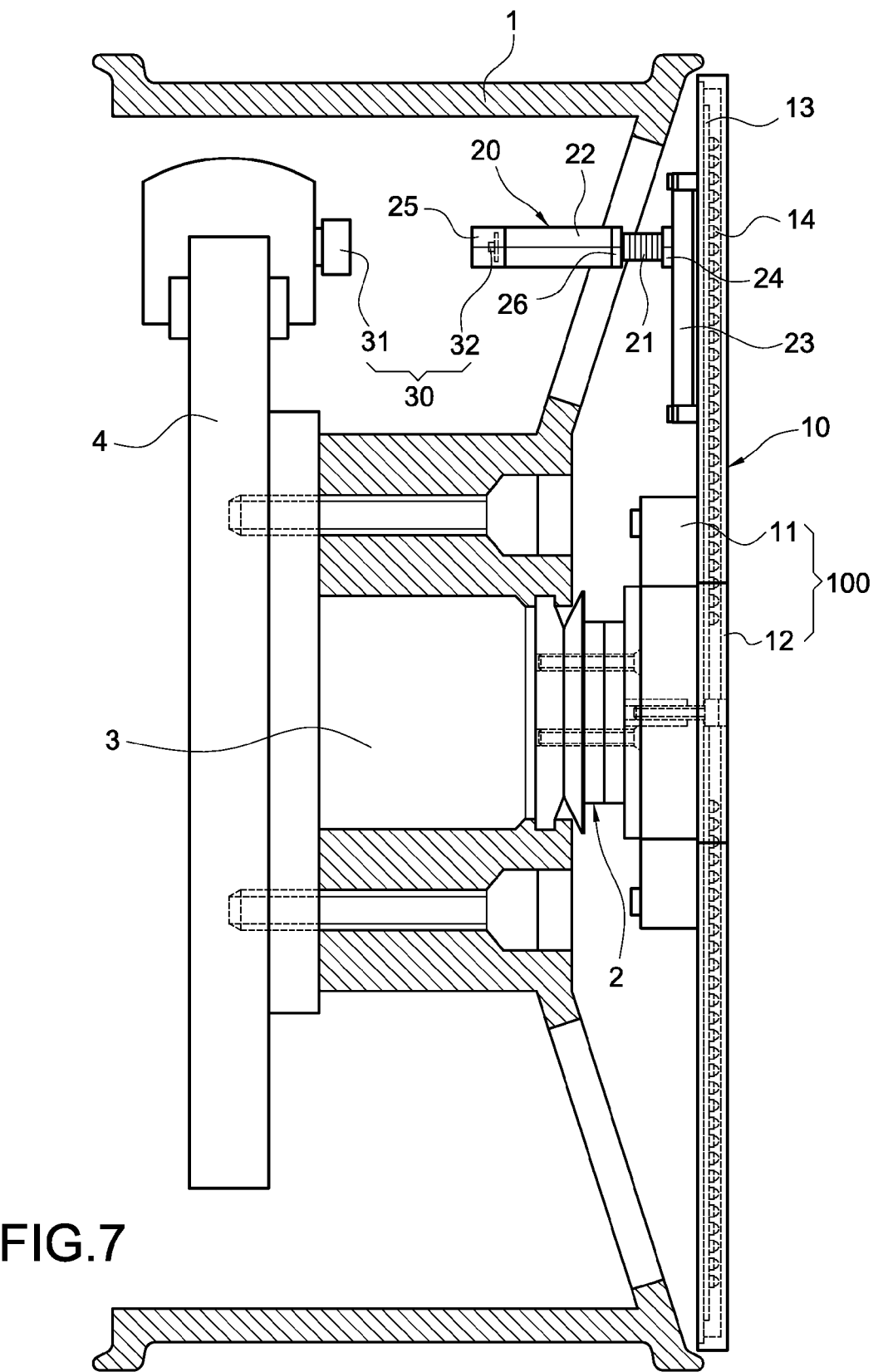
FIG. 7 is a schematic view of an adjustable rod fixed to a wheel rim in accordance with the present invention.

With reference to FIGS. 5 to 7 for a cross-sectional view of an adjustable rod, a schematic view of adjusting an interval of a sensor and a schematic view of an automobile wheel rim decoration device fixed to a wheel rim in accordance with the present invention respectively, the adjustable rod 20 is combined to the fixing frame 23 and coupled onto the bottom plate 11 of the light emitting module 10, such that when the movable rod 22 is rotated, the movable rod 22 can be moved vertically with respect to the fixed rod 21, wherein the light emitting module 10 is fixed to a center hole 3 of the wheel rim 1 by a clamping mechanism 2. In addition, the first sensing element 31 is fixed onto a brake component 4 (such as a brake caliper) of the wheel rim 1, such that an interval 300 is maintained between the first sensing element 31 and the second sensing element 32. If the interval 300 is too long or too short, then the fixed rod 21 can be moved to a fixed position of the fixing frame 23 for adjusting the position in a horizontal direction, and the movable rod 22 is moved with respect to the fixed rod 21 for adjusting the position in a vertical direction, so as to change relative positions (including vertical and horizontal adjustments) of the first sensing element 31 and the second sensing element 32. Therefore, the interval 300 between the first sensing element 31 and the second sensing element 32 can be increased or decreased to adjust the sensitivity of the pair of sensing elements.

Further, the pair of sensing elements can be a pair of light sensors, and the first sensing element 31 can be a light transmitter, and the second sensing element 32 can be a light receiver. Alternatively, the pair of sensing elements can be electromagnetic conversion sensors (such as Hall sensors) for measuring a change of signals corresponding to a magnetic field between the first and second sensing elements 31, 32 to detect relative positions of the first and second sensing elements 31, 32, and the relative positions are used as a basis for changing the speed of the automobile, and the first and second sensing elements 31, 32 are installed to the brake component 4 of the automobile body and the light emitting module 10 of the wheel rim 1 respectively. When the second sensing element 32 is rotated together with the wheel rim 1, the first sensing element 31 fixed onto the brake caliper can sense a change of signals of the first sensing element 31 to detect a position of the wheel rim with respect to the automobile body and a rotation speed, and the detected signals are transmitted to a microprocessor installed on a circuit board of the light emitting module 10 for controlling the light emission time and color. By the principle of visual retention, pre-stored graphic files can be used for displaying stable figures with a changing light emission on a certain region of an automobile wheel one by one according to a predetermined sequence, while the wheel is rotating clockwise.

While the invention has been described by means of specific embodiments, numerous modifications and variations could be made thereto by those skilled in the art without departing from the scope and spirit of the invention set forth in the claims.

What is claimed is:

1. An automobile wheel rim light decoration device with an adjustable sensing interval, and the automobile having a brake component, and the automobile wheel rim light decoration device comprising:
   a light emitting module, including a plurality of light emitting units installed to a retaining base of the wheel rim and fixed to the retaining base;
   an adjustable rod, including a fixed rod installed to the retaining base and coupled to a movable rod of the fixed rod; and
   a pair of sensing elements, including a first sensing element and a second sensing element for detecting a signal of the first sensing element, and the first sensing element being fixed to the brake component, and the second sensing element being fixed to the movable rod at a position corresponding to the first sensing element, and the second sensing element being electrically coupled to the light emitting units;
   thereby, if the movable rod is adjusted to be moved with respect to the fixed rod, relative positions of the first sensing element and the second sensing element can be changed.

2. The automobile wheel rim light decoration device with an adjustable sensing interval as recited in claim 1, wherein the retaining base includes a bottom plate and a top cover covered onto and engaged with the bottom plate.

3. The automobile wheel rim light decoration device with an adjustable sensing interval as recited in claim 1, wherein the light emitting unit is a light emitting diode.

4. The automobile wheel rim light decoration device with an adjustable sensing interval as recited in claim 1, wherein the light emitting module further includes a circuit board installed in the retaining base, and having the light emitting units electrically coupled to the circuit board.

5. The automobile wheel rim light decoration device with an adjustable sensing interval as recited in claim 4, wherein the second sensing element is electrically coupled to the circuit board.

6. The automobile wheel rim light decoration device with an adjustable sensing interval as recited in claim 1, wherein the adjustable rod further includes a fixing frame mounted onto the retaining base by a plurality of locking elements.

7. The automobile wheel rim light decoration device with an adjustable sensing interval as recited in claim 6, wherein the fixing frame includes a flat plate and two side plates vertically extended from both sides of the flat plate, and a support plate is extended separately and parallelly from the two side plates.

8. The automobile wheel rim light decoration device with an adjustable sensing interval as recited in claim 7, wherein the flat plate includes a through slot for passing the fixed rod.

9. The automobile wheel rim light decoration device with an adjustable sensing interval as recited in claim 8, wherein the fixed rod is a bolt passed through the through slot and fixed to the fixing frame by a nut.

10. The automobile wheel rim light decoration device with an adjustable sensing interval as recited in claim 9, wherein the movable rod includes an internal thread, and the movable rod is coupled onto the fixed rod by a screwing connection.

11. The automobile wheel rim light decoration device with an adjustable sensing interval as recited in claim 10, wherein the movable rod further includes a seal cover covered onto and engaged with the second sensing element.

12. The automobile wheel rim light decoration device with an adjustable sensing interval as recited in claim 1, wherein the pair of sensing elements are a pair of light sensors, and the first sensing element is a light transmitter, and the second sensing element is a light receiver.

13. The automobile wheel rim light decoration device with an adjustable sensing interval as recited in claim 1, wherein the pair of sensing elements are electromagnetic conversion sensors.

14. The automobile wheel rim light decoration device with an adjustable sensing interval as recited in claim 13, wherein the pair of sensing elements are Hall sensors.

* * * * *